L. J. MILLER AND W. W. CHRISTIAN.
AUTOMOBILE SIGNAL.
APPLICATION FILED MAY 20, 1920.
1,390,150.
Patented Sept. 6, 1921.
3 SHEETS—SHEET 1.
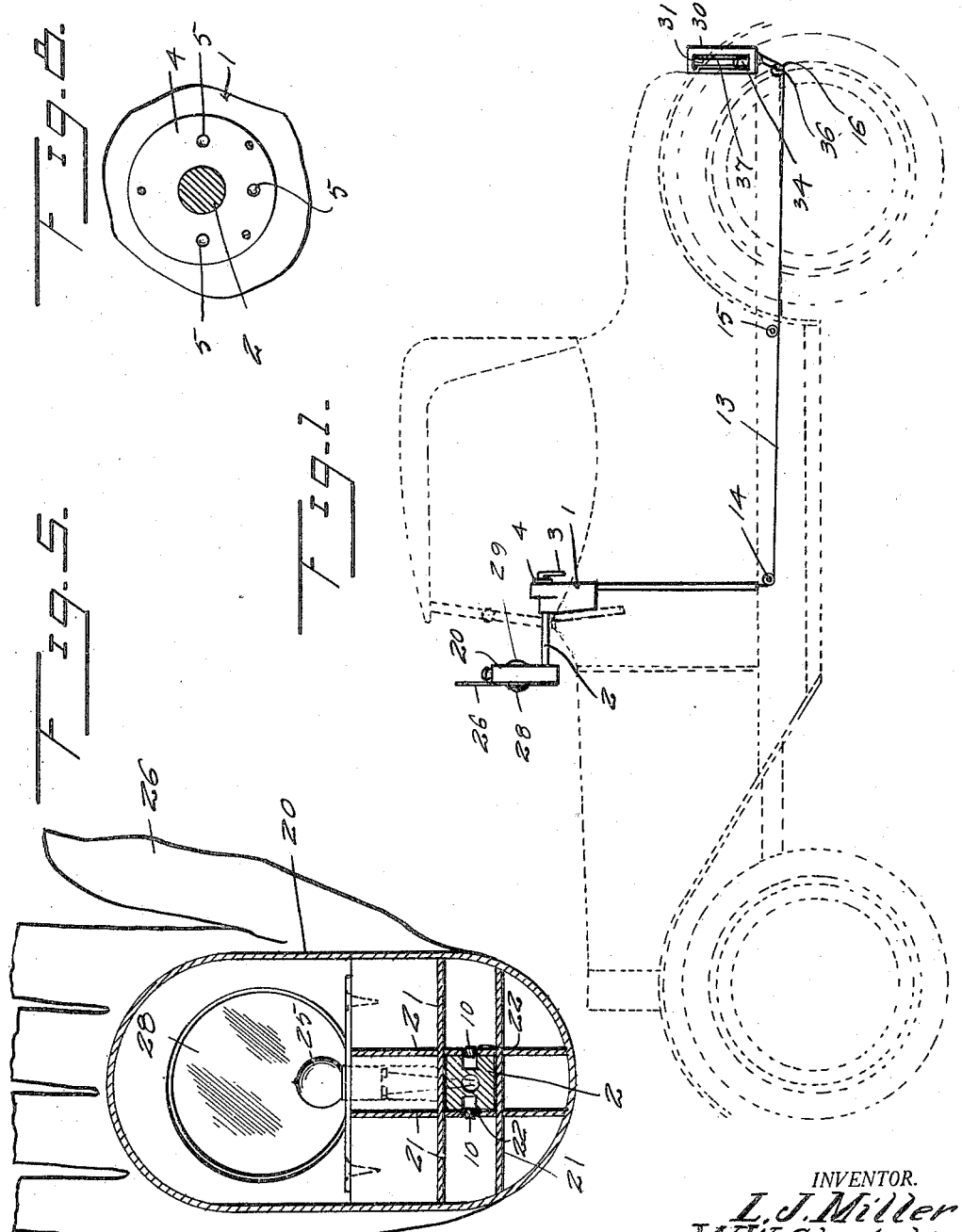
INVENTOR.
L. J. Miller
W. W. Christian
BY
ATTORNEY.

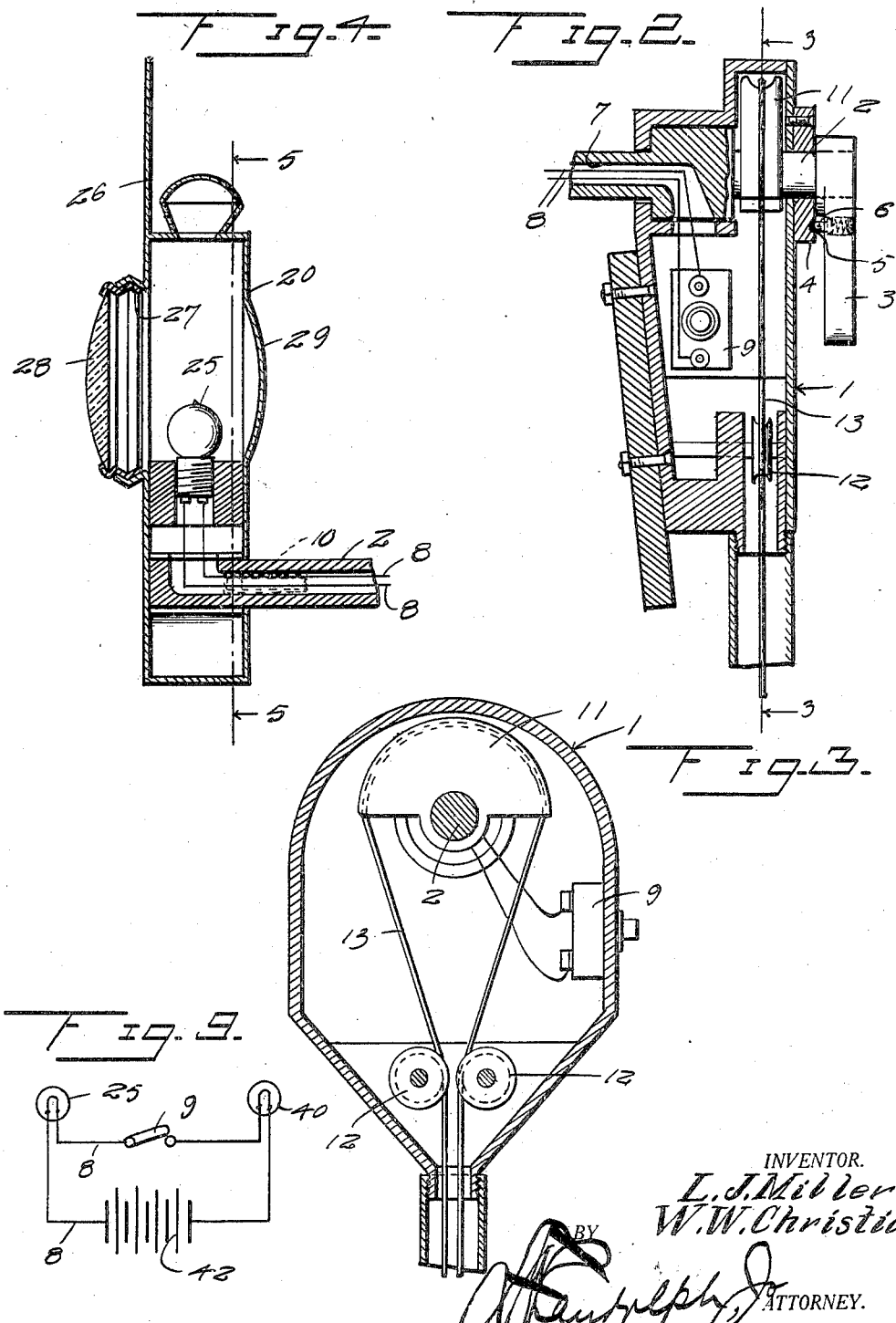

L. J. MILLER AND W. W. CHRISTIAN.
AUTOMOBILE SIGNAL.
APPLICATION FILED MAY 20, 1920.
1,390,150.
Patented Sept. 6, 1921.
3 SHEETS—SHEET 3.
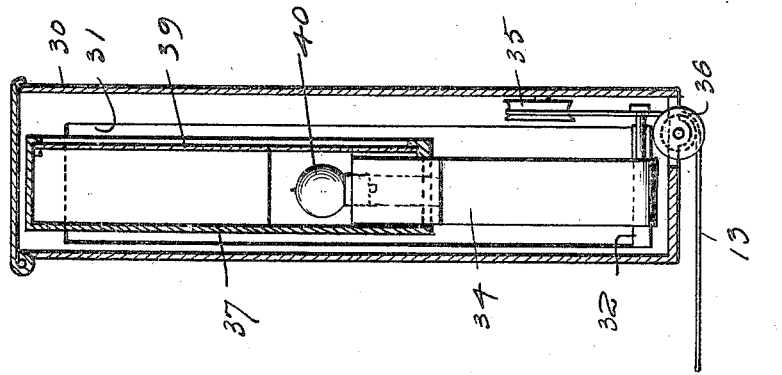
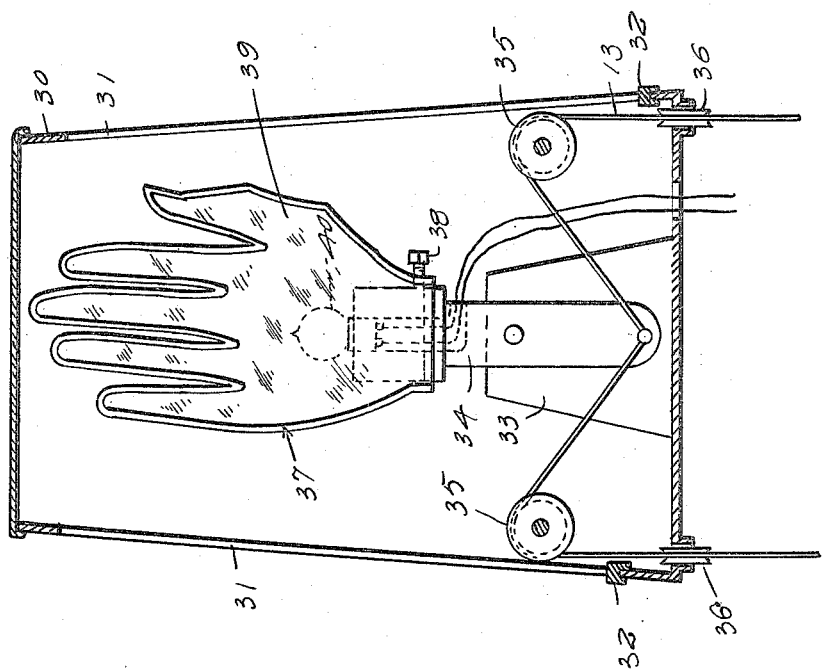
INVENTOR.
L. J. Miller
W. W. Christian
BY
, ATTORNEY.

UNITED STATES PATENT OFFICE.

LAWRENCE J. MILLER AND WARREN W. CHRISTIAN, OF ST. LOUIS, MISSOURI.

AUTOMOBILE-SIGNAL.

1,390,150.  Specification of Letters Patent.  Patented Sept. 6, 1921.

Application filed May 20, 1920. Serial No. 382,855.

*To all whom it may concern:*

Be it known that we, LAWRENCE J. MILLER and WARREN W. CHRISTIAN, citizens of the United States, residing at city of St. Louis and State of Missouri, have invented certain new and useful Improvements in Automobile-Signals; and we do hereby declare the following to be a full, clear, and exact description of the invention, such as will enable others skilled in the art to which it appertains to make and use the same.

This invention relates to automobile signals and it consists in the novel features hereinafter described and claimed.

An object of the invention is to provide a signal of the character stated including lamps adapted to be positioned at the forward and rear portions of the body of the automobile and electric means for illuminating the same. The said lamps being provided with hands pivotally mounted and adapted to be swung from upright positions to horizontal positions to indicate the turn which is about to be made by the automobile. Means are provided for swinging the hands and the said means is adapted to be operated by the driver of the automobile and is positioned in front of the driver's seat and upon the body of the machine.

A further object of the invention is to provide improved operating means adapted to simultaneously swing the hands of the forward and rear lamps and to securely hold them at the positions to which they are swung.

A further object of the invention is to provide an improved structure for the forward automobile lamps, which structure may be readily detached from the operating machine, and the said forward lamp is adapted to serve as a combined headlight lamp and a signal lamp.

A still further object of the invention is to provide an improved structure for the rear end lamp which may serve as a danger signal and also serve as a signal to indicate in which direction the automobile is about to be steered or turned.

With these objects in view the automobile signal comprises an operating mechanism which includes a casing adapted to be positioned upon the dash board of the machine or upon the engine hood, and having a shaft journaled in the upper portion thereof. The head or forward lamp is detachably mounted upon the said shaft and is restrained to turn in unison with the same as the shaft is rotated. A pulley is mounted upon the shaft and a cable is attached to the pulley. The ends of the said cable are connected with the hand which is pivotally mounted in the rear lamp. Electric switches are provided at the sides of the casing and one of them is connected with the rear lamp and the other with the forward lamp by means of wires which pass through the shaft which is journaled in the casing. The switches are also electrically connected with a source of electric supply as for instance a battery. Means are provided for locking the shaft at the position to which it is turned in the casing. The forward lamp is detachably mounted upon the end of the shaft and the shaft is provided with spring clips adapted to engage the said lamp and retain the same in position thereon. The forward lamp is provided with partitions which are spaced from each other and arranged in cruciform relation whereby a socket is provided for receiving the forward end portion of the shaft. The front side of the casing of the forward lamp is hingedly connected with the body thereof, and is in the general configuration of a hand. A lamp bulb is mounted upon the partition in the body of the forward lamp and is electrically connected with the wires which are led through the shaft.

The rear lamp comprises a casing provided at its side with openings having cushions located at the lower edge thereof. A hand is pivotally mounted in the casing and carries an electric bulb which is connected with the wires hereinbefore mentioned and the said hand is also connected with the cable hereinbefore described. The cable, when moved longitudinally is adapted to swing the hand in the rear lamp from a vertical position to, approximately, a horizontal position through the opening at either side of the casing of the rear lamp. Thus the hand will be exposed at one side or the other of the casing when the automobile is about to make a turn and inasmuch as it carries the lamp bulb it is illuminated and will indicate to the driver of a machine following the machine equipped with the apparatus in which direction the preceding machine is about to make a turn.

In the accompanying drawings—

Figure 1 is a side elevation of the automobile signal illustrating the same applied to an automobile which is indicated in dotted lines.

Fig. 2 is a vertical sectional view of the lamps operating mechanism.

Fig. 3 is a similar view of the lamp operating mechanism cut on a plane lying at a right angle to the view illustrated in Fig. 2.

Fig. 4 is a vertical sectional view of the forward lamp.

Fig. 5 is a similar view of the forward lamp cut on a plane at a right angle to the view shown in Fig. 4.

Fig. 6 is a vertical sectional view of the rear lamp.

Fig. 7 is a similar view of the rear lamp cut on a plane lying a right angle to the plane upon which the view as illustrated in Fig. 6 is cut.

The other figures are detailed views of the features of the invention.

The operating mechanism of the automobile signal comprises a casing 1 preferably of metal and adapted to be applied to the dash board of an automobile or to the hood of the engine thereof in any suitable manner. A shaft 2 is journaled for rotation in the upper portion of the casing 1 and carries at its rear end a handle 3. A collar 4 is mounted upon the casing 1 and the shaft 2 passes through the said collar. The collar is provided with notches 5, one notch being located vertically below the axis of the shaft 2 and one notch at each side of a vertical plane passing through the axis of the shaft. The handle 3 is provided with a spring catch 6 which is adapted to engage in any one of the notches 5 whereby the shaft 2 is held at the position to which it is turned in the casing and collar. The shaft 2 is provided at its forward end portion with a passageway 7, the inner end of which opens at the side of the shaft between the forward and rear side of the casing 1. The passageway 7 receives electric wires 8 which are connected with a switch 9 located at the side of the casing 1. The forward ends of the wires 8 are connected with a bulb located in the forward lamp as will be explained hereinafter. The shaft 2 carries at its forward end spring catches 10 which are adapted to engage the casing of the forward lamp and hold the same in position upon the shaft. The forward end portion of the shaft 2 is squared and this squared portion is adapted to enter a socket provided in the forward lamp as will be explained. A pulley 11 is mounted upon the intermediate portion of the shaft 2 and is located between the front and rear sides of the casing 1. Pulleys 12 are journaled at the lower portion of the casing 1 and a cable 13 is secured at a point between its ends to the upper side of the pulley 11 and the cable 13 has contact with the inner portions of the peripheries of the pulleys 12. Pulleys 14 are journaled under the body of the automobile machine, and the cables 13 are trained around the pulleys 14 and led rearwardly under the body of the automobile machine and over supporting pulleys 15 and around pulleys 16 mounted at the rear portion of the body of the automobile and extend up into the rear last casing as will be explained hereinafter.

The forward lamp comprises a body 20 preferably of sheet metal having partitions 21 located therein and arranged in cruciform relation with respect to each other. The said partitions are so spaced as to leave a socket 22 at the intermediate portion of the body and the forward end of the shaft 1 is received in the socket 22 when the forward lamp is applied to the shaft, and inasmuch as the forward portion of the shaft is squared and fits snugly against the walls of the socket, the body 20 is compelled to turn with the shaft as the shaft is rotated in the casing which sustains the same. The walls of the socket 22 are provided with recesses 23 which receive the end portions of the catch members 10. A lamp bulb socket 24 is located in the body 20 and is adapted to receive the shank of a bulb 25 in the usual manner. The wires 8 hereinbefore described are connected with the bulb and socket in the usual manner. The forward side member 26 of the forward lamp is hingedly connected with the body 1 and is in the general configuration of a hand. The said side portion is provided with an opening 27 over which is located a lens 28 and the rays of light from the bulb 25 pass from the body through the said lens and are cast in a forward direction in the usual manner. The body 20 is provided at its rear side with reflector portions 29 which are located behind the bulb 25.

When the shaft 2 is turned by the driver or operator after he has disengaged the catch 6 from the notches 5 the lamp body 20 is swung to one side or the other of the vertical plane passing through the axis of the shaft 2. Thus the hand plate 26 is moved from a vertical position to a horizontal position and is disposed at one side or the other of the axis of the shaft. If the automobile operator intends to steer his machine to the right the shaft is so turned that the hand plate 26 is disposed at the right hand side of the axis of the shaft 2. If the automobile driver intends to steer his machine to the left the shaft 2 is turned whereby the hand plate 26 is disposed at the left side of the axis of the shaft 2. Thus the light which is carried by the forward lamp serves as a head light and also serves as means for signaling or indicating the direction in which the machine which is being driven is about to make a turn.

The rear end lamp of the automobile signal comprises a casing 30 adapted to be mounted at the rear side of the body of the automobile and the casing 30 is provided at its sides with openings 31 having cushions 32 mounted upon the lower edges thereof. A block 33 is mounted in the casing 30 and an arm 34 is pivotally mounted upon the block. The cable 13 hereinbefore described is connected with the lower end of the arm 34 and the cable is trained over pulleys 35 located in the casing 1 and under pulleys 36 mounted at the lower side of the casing 30. Therefore as the cable 13 is moved longitudinally the arm 34 is swung upon its pivotal connection with the block 33. A frame 37, in the form of a hand, is mounted upon the upper end of the arm 34 and is secured in position thereon by means of a set screw 38. The rear side of the frame 37 is of transparent material as glass and the said transparent side is indicated at 29. A bulb 40 is located in the frame 37 and is mounted upon the upper end of the arm 34 and an electric wire 41 is connected with the bulb in a usual manner, and is also connected with one of the switches 9 provided upon the casing 1 hereinbefore described. The switches 9 are connected with a battery 42 which is carried at any convenient point upon the body of the automobile.

Under normal conditions and when the machine to which the device is applied is traveling in a straight forward direction the arm 34 is vertically disposed but when the machine is about to be turned to one side or the other and the operator manipulates the shaft as hereinbefore described, the cable 13 is moved longitudinally, whereby the arms 34 are swung so that the hand frame 37 will assume a position at one side or the other of a vertical plane passing through the point of pivotal connection between the arm 34 and the block 33, and the said frame 37 will be projected through one of the openings 31 at the side of the casing 30. The frame 37 will also engage one of the cushions 32 mounted at the lower edge of that opening through which the said frame is projected.

Therefore the operator of a machine which is following a machine to which the device is applied may observe the rear lamp and which will indicate the direction in which the preceding machine is about to make a turn.

From the foregoing description taken in conjunction with the drawings it will be seen that an automobile signaling device of simple and durable structure is provided and that the same may be conveniently used for indicating to those who are in front of the machine to which the device is applied and to those who are following behind the said machine, the direction in which the machine to which the device is applied to about to make a turn.

Having described the invention what is claimed is:

1. An automobile signal comprising a shaft journaled for rotation, said shaft having a squared end portion, a signal, and members carried by the signal and arranged in cruciform relation with respect to each other and spaced from each other thereby leaving a socket which receives the forward portion of the shaft.

2. An automobile signal having a casing, a shaft operable to turn the same, partition members within the casing arranged to provide a socket, said shaft being disposed in said socket and means to fasten the shaft in said socket.

3. An automobile signal having a casing, a shaft operable to turn the same, partition members within the casing arranged to provide a socket, said shaft being disposed in said socket, means to fasten the shaft in said socket consisting of a slot provided in one of the partitions, and a yieldable fastening member on the shaft to enter the same.

4. An automobile signal having a casing, a shaft operable to turn the same, crossed partition members within the casing arranged to provide a socket and a lamp supporting means in alinement therewith and said shaft at one end being disposed in said socket and conforming in shape thereto to form a rigid connection.

5. An automobile signal having a shaft, a casing mounting the shaft, means on the shaft abutting the casing to prevent displacement of the shaft in one direction, a pulley on the shaft, a closure for the casing opposite the pulley to prevent displacement of the shaft in the opposite direction, a signal, and signal operating means trained over the pulley.

6. An automobile signal having a shaft, a casing mounting the shaft, means on the shaft abutting the casing to prevent displacement of the shaft in one direction, a pulley on the shaft, a closure for the casing opposite the pulley to prevent displacement of the shaft in the opposite direction, a bearing for the shaft on said closure, a handle for the shaft, means associated with the handle and bearing to releasably maintain the shaft in different positions, a signal, and signal operating means trained over the pulley.

In testimony whereof we affix our signatures in presence of two witnesses.

LAWRENCE J. MILLER.
WARREN W. CHRISTIAN.

Witnesses:
J. M. LEWIS,
BEN. WILDIRSEN.